US006784983B1

(12) United States Patent
Bjerkan et al.

(10) Patent No.: US 6,784,983 B1
(45) Date of Patent: Aug. 31, 2004

(54) SYSTEM FOR MONITORING CABLES

(75) Inventors: Leif Bjerkan, Heimdal (NO); Petter Støa, Heimdal (NO)

(73) Assignee: Leiv Eiriksson Nyfotek AS, Trondheim (NO)

( * ) Notice: Subject to any disclaimer, the term of this patent is extended or adjusted under 35 U.S.C. 154(b) by 0 days.

(21) Appl. No.: 09/959,666

(22) PCT Filed: Apr. 27, 2000

(86) PCT No.: PCT/NO00/00141
§ 371 (c)(1),
(2), (4) Date: Nov. 2, 2001

(87) PCT Pub. No.: WO00/68657
PCT Pub. Date: Nov. 16, 2000

(30) Foreign Application Priority Data

May 6, 1999 (NO) .............................................. 992219

(51) Int. Cl.[7] .............................................. G01N 21/00
(52) U.S. Cl. .................................................... 356/73.1
(58) Field of Search ...... 356/73.1; 250/227.14–227.18; 385/10–13, 77; 73/800

(56) References Cited

FOREIGN PATENT DOCUMENTS

| DE | 3518909 A1 | 11/1986 |
| GB | 2 329 722 A | 3/1999 |
| WO | WO 86/01286 A1 | 2/1986 |
| WO | WO 99/32862 A1 | 7/1999 |

OTHER PUBLICATIONS

F. M. Araujo, et al., "Surveillance of Fiber Optic Cables and Electric Power Cables Using Fiber Bragg Grating Sensors", *Fiber Optic and Laser Sensors and Application*, Nov. 1998, 279–289, v3541, SPIE—The International Society for Optical Engineering, Boston, MA.

J.H. Kalinowski, et al., "Multiplexed Fiber Optics Bragg Grating Sensors for Strain and Temperature measurements in Power Systems" *Proc. SPIE—Int. Soc. Opt. Eng.*, 1999, 544–553, v3666,The International Society for Optical Engineering, Boston, USA.

*Primary Examiner*—Tu T. Nguyen
(74) *Attorney, Agent, or Firm*—Rothwell, Figg, Ernst & Manbeck

(57) ABSTRACT

System for monitoring high-tension cables in air stretches as well as a use of the same. The system comprises at least one optic fiber fastened to the high tension cable, the optic fiber including at least one Bragg grating with known reflection characteristics, a light source for emitting light within a known range of wavelengths into the optic fiber, and measuring devices for detection of light reflected from the Bragg grating in the fiber and for recognizing light reflected from each Bragg grating based on their known reflection characteristics.

12 Claims, 2 Drawing Sheets

SYSTEM FOR MONITORING CABLES

BACKGROUND OF THE INVENTION

1. Field of the Invention

The present invention relates to a system for monitoring high voltage cables in air stretches.

2. Description of the Related Art

Air lines for power supply is subject to mechanical strains from the environment such as snow and ice load, lightnings, extreme temperatures and wind given from terrain and geographical and topographical conditions. Critical wind strains are extreme wind gusts, vibrations wearing on the end mounts and galloping which may raise from a combination of wind and ice loads and may produce short circuits and damage on the lines. In general extreme climatic strains may result in power breaks and substantial repair works with large economical consequences. A real time monitoring system especially in inaccessible areas may provide information about lines and/or masts being subject to critical loads so that corrective procedures may be performed before larger damage occurs.

Conventional methods for registering climatic strains have until now mainly been based on indirect measurements of the search for variables. Simple ice rigs or a couple of stretches of conductors without voltage is combined with strain detectors to provide a value for icing in the related area. Optical telescopes are used for measuring vibrations over short time periods. Video cameras are used for visual inspection of galloping in chosen point on the line. Common for all these solutions are that they do not measure the direct strain on the line, but variables which in a varying degree is directly related to this. One of the reasons for these problems is the handling at the high voltages. These methods depends on local power supply. Optical fibers of quarts glass are immune to electromagnetic fields and the signal propagation is therefore not affected by the high voltage environment. Also the signals may be transported over long distances so that one does not have to depend on local power supplies. Supply fibers positioned in a suitable fiber optic cable may easily be winded around a power line in the same way as fibers used for communication, which now is a well known method. Alternatively the fibers are integrated in a line strand. The most important difference between the existing and the present method for measuring climatic strains is, however, that the climatically induced strains on the power line is measured directly, and not through variable providing a more or less sufficient basis for calculating them.

The invention consists of a new method making it possible to register climatic strains in high voltage air stretches. The method is based on fiber optic sensors, preferably Bragg gratings. This type of measuring systems are described in a number of different patent publications, for example U.S. Pat. No. 5,845,033, which describes a fiber optic measuring system for monitoring pipes in oil and gas systems. The optical measuring system comprises an optical fiber being wound along a helical line on the pipe. In its longitudinal direction the optical fiber is provided with a number of sensors, being Bragg gratings, adapted to reflect light with different wavelengths. A light source emits light with a large range of wavelengths into the fiber. As the different Bragg gratings reflect light with different wavelengths strain induced changes in the different gratings will indicate the amplitude and the position of the provided strain as changes in the spectrum of the reflected light. This system demands robust solutions because of the very demanding environment in which it is meant to be used, as the sensor is positioned on the outside of the pipe. The system also requires dedicated equipment adapted to the measurements.

In international patent application PCT/US94/00967 a more general description of a known sensor system of the type used in the above mentioned US patent is provided, without giving any specific field of use.

SUMMARY OF THE INVENTION

It is an object of the present invention to provide a monitoring system for power lines which in an exact and cost effective way makes it possible to monitor under varying weather conditions without positioning sensor equipment locally. This is obtained with a system and a use of the equipment as described in the independent claims.

Recently fiber optic cables for telecommunication purposes has been mounted on high voltage cables. An additional advantage related to this invention is that existing equipment may be used to mount and to a certain degree control the measuring system, which reduces the costs and provides a cost effective system.

The invention will be described below with reference to the accompanying drawings, illustrating examples of embodiments.

DETAILED DESCRIPTION OF THE PREFERRED EMBODIMENTS

Figure 1:
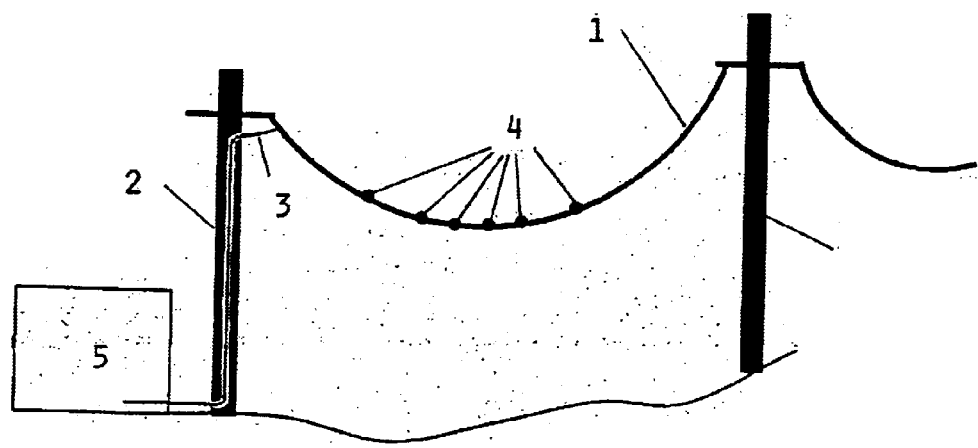
FIG. 1 illustrates a span in a high voltage cable with a number of sensors mounted in chosen positions.

FIG. 1 shows a high voltage cable of a known type stretched between two pylons 2. An optical fiber 3 is mounted on the power cable 1 and is provided with a number of sensors comprising Bragg gratings. The sensors 4 are positioned on places along the cable which according to experience are subject to large strains, so that an increase in strain is discovered at as early stage as possible. In addition the positioned of the sensors are chosen so as to measure only on cable stretches being especially exposed, such as long stretches over fjord crossings where vibrations is a known problem and in exposed mounted regions where icing and galloping are known problems.

The optical fiber will ordinarily be covered by a protecting casing, especially in regions being exposed to weather and wind, and may be fastened to the high voltage cables in the same way as optical fibers being used in telecommunications, by using equipment developed for this purpose. It is especially preferred according to the invention that the cable is positioned in a metal free fiber cable, as it is preferred that the measuring system is electrically insulated from the high voltage environment. According to a preferred embodiment of the invention the optical fiber 2 is mounted in the high voltage cable Itself during the production of this. The latter solution will provide optimal protection and thus reduce the error sources due to fiber damage.

In FIG. 1 the optical fiber 3 is lead away from the high voltage cable 1 to a central measuring station 5, which preferably is positioned together with other service equipment and similar for the system, for example in relation to a transformer station. Because of the low loss in the optical fiber the central measuring station 5 may be positioned at location being relatively far from the cable or cables being monitored. In this drawing the measurements are performed over a single stretch, but measurements over several stretches are of course possible.

Figure 2:
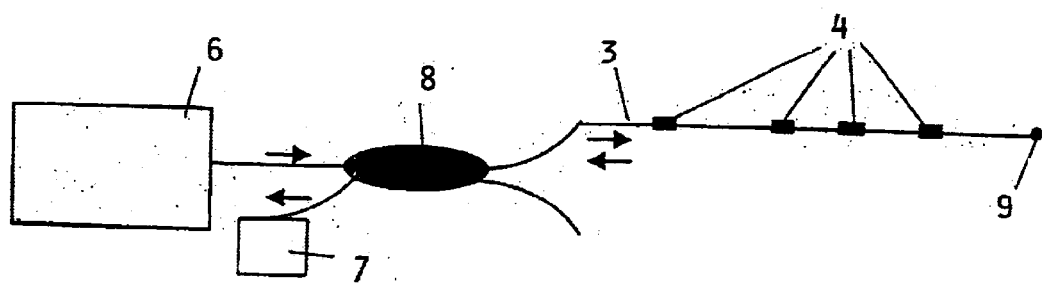
FIG. 2 illustrates schematically an embodiment of a per se known optical sensor set up.

In FIG. 2 a known measuring assembly is illustrated for use according to the invention. In the illustrated measuring assembly a light source 6, for example a laser or a super luminescent diode, emits light within a well defined range of wavelengths into the optic fiber 3 through an optic coupler 8.

As described in the abovementioned patent publications light will be reflected from the Bragg gratings 4, and the reflected light is lead through the coupler 8 toward a detector system 7 measuring the spectrum of the reflected signal. The wavelength of these reflections is uniquely given by the period of the grating and thus the strain from the surrounding structure on each Bragg grating. The effect of the strain on the Bragg grating is determined beforehand by calibration. This way each Bragg grating will function as a strain sensor. If the reflection without external stimulation of the sensors or Bragg gratings 4 is known changes may be used to detect changes in the sensors 4.

Bragg gratings may be provided with different reflection characteristics, for example given by different grating constants, so that each change may indicate in which sensor and thus which position along high voltage cable the change has been.

Alternatively the emitted signal may be pulsed, so that the time of arrival for the received pulse may indicate the position, but this will require some filtering of unwanted signals as there will occur some reflections between the Bragg gratings.

The fiber end 9 may be provided with means to avoid reflections back to the detector system 7, but since the distance to the end is well defined this reflection, if the emitted signal is pulsed, is easily removed in a per se known way in the detector system.

As an alternatively to the solution shown in FIG. 2 a number of optical fibers may be used in which each comprises one or more sensors 4. Which solution that is chosen will among other things depend on the cost related to the handling of a larger number of fibers measured against the possibility for separating a large number of sensors In one single fiber. The illustrated solution will usually be the preferred.

Figure 3:
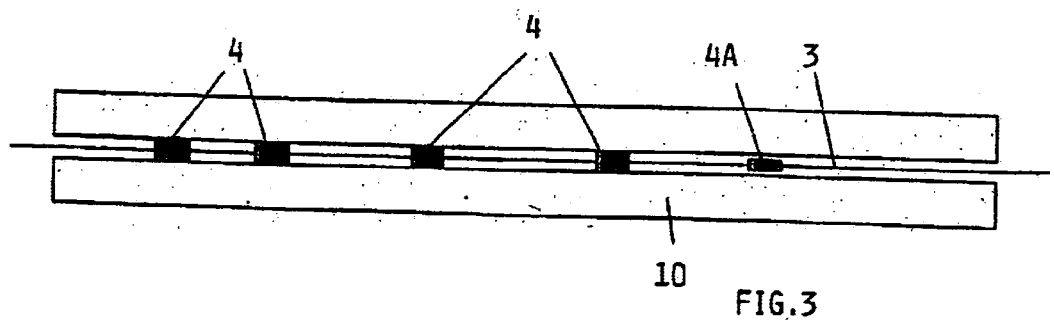
FIG. 3 shows an embodiment of the invention in which the optical fiber is positioned inside a tube, which preferably is a hollow strand.

In FIG. 3 an optical fiber 3 is shown comprising five sensors 4,4A, where the optical fiber is mounted in a tube or a strand 10. Four of the sensors 4 are fastened to the tube so that they will be affected by, and thus have the ability to detect, strain in the tube. The sensors 4 may be fastened to the tube in several ways, preferably with epoxy adhesive.

The fifth sensors 4A is not fastened to the tube and will therefore not be affected by the strain on the tube. The fifth sensor will, however, be affected in the same way as the others by temperature changes in the optical fiber and may thus be used as a reference to correct changes due to the relatively large temperature fluctuations which a high voltage cable may be subject to. A number of such reference sensors 4A may be positioned in different places along the high voltage cable to provide a possibility for compensating for temperature variations.

By mounting the fiber 3 outside a high voltage cable 1 the reference sensor 4A may be positioned in a suitable casing so as not to be affected by stretch, and at the same time being protected from other influences such as ice and water.

Figure 4:
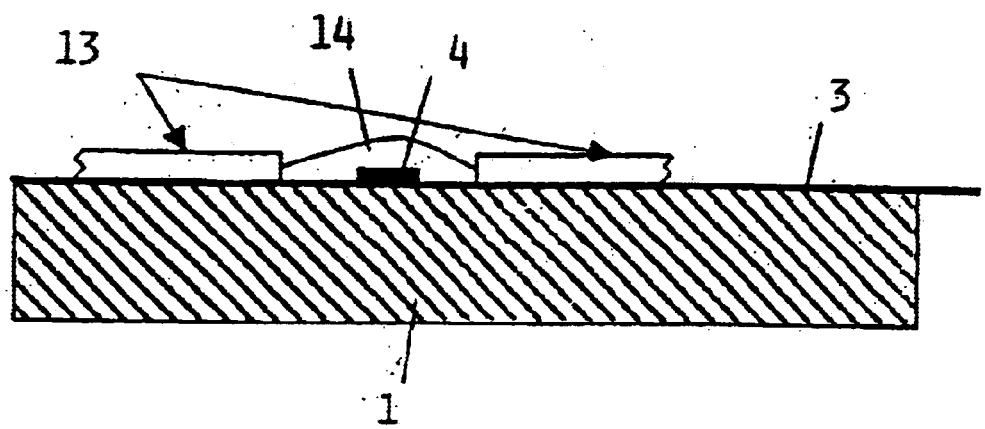
FIG. 4 shows an embodiment of a Bragg grating mounted on a surface.

FIG. 4 illustrates a sensor 4 mounted on the surface of a high voltage cable 1. In this example the optic fibers 3 cladding 13 is removed in a limited area, and the Bragg grating 45 is fastened to the fiber 3 so that its characteristics is changed in a certain area. A protecting layer 14 is placed over the uncovered fiber. Preferably both the cladding and the sensor area is covered by an additional protecting layer, for example plastic, to protect against influences from outside.

There exists a number of methods to make a Bragg grating in an optical fiber, such as diffusion, use of laser and similar. These solutions are well known within the technical art and will not be described in any detail here. The chosen solution does not have any important effect on the principle of the invention.

For better protection both when being mounted and later the fiber area containing the Bragg gratings for strain measurements is glued into a thin protective sleeve of metal being shaped according to the curvature of the line strands. This protective sleeve has a diameter being approximately the same as the fiber cable transporting the signals, and both ends are fastened to the fiber cable. With more Bragg gratings in a series the protective sleeve may advantageously be made as a split cylinder with a trace in the center for the fiber with the Bragg grating and where the fiber, the two parts of the sleeve and the ends of the fiber cable are glued beforehand. This sleeve is glued or molded to the high voltage line when being mounted.

Figure 5:
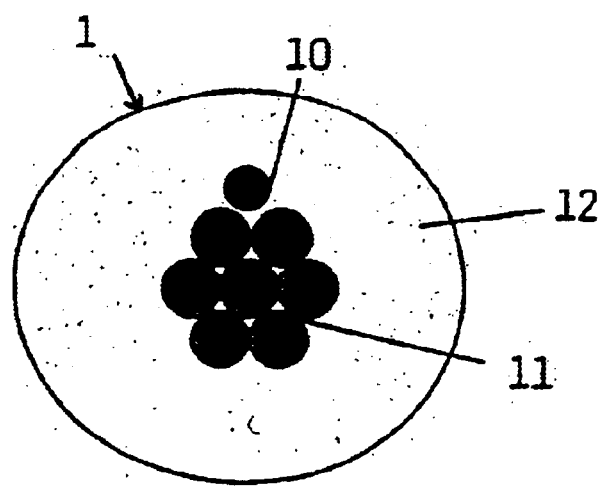
FIG. 5 shows a fiber mounted in a plastic cover line.

FIG. 5 shows a cross section of a high voltage cable 1 comprising wires 11 or strands being preferably wound around each other. In addition the high voltage cable comprises a tube 10, for example as illustrates in FIG. 3 comprising one or more optical fibers for measuring, also being wound around the wires 11 so that it adds to the construction of the high voltage cable in a natural way. The tube 10 may possibly also comprise optical or other conductors suitable for other purposes, for example telecommunication. The high voltage cable is also covered by a protective plastic layer 12.

As indicated above the optical fiber or fibers may be fastened to the cable in different ways. If measurements are to be performed on existing high voltage cables the fibers may be wound on the outside of the cable, possibly at the same time as or in relation to, installation of telecommunication lines. The optical fibers may then be glued directly to the high voltage cable, as shown in FIG. 4, or be positioned in a protective tube, as shown in FIG. 3. To measure the stretch it is only necessary to glue the sensor points, which is the Bragg gratings, to the high voltage cable. During production of new high voltage cables the solution illustrated in FIG. 5 may be chosen, where the tube 10 is wound between the strands and the plastic protection, or, if the high voltage cable is not coated with plastic, so that the tube constitutes one of the strands in the high voltage cable.

The optical fibers or conductors 3 may be of any known type, usually standardized fibers of quarts glass, but other solutions using special fibers may of course be used in some cases. The other components in the measuring system are adapted to the fiber regarding compatibility with the chosen fiber material, e.g. in relation to wavelength of the emitted light, and characteristics under the different conditions, such as temperature and humidity.

What is claimed is:

1. System for monitoring high voltage cables in air stretches, comprising at least one optical fiber fastened to the cable, said optical fiber comprising at least one Bragg grating with known reflection characteristics, a light source for transmitting light within a known range of wavelengths into said optical fibre, measuring devices for detection of light reflected from said Bragg grating in the fiber and for recognizing light reflected from each Bragg grating based on their known reflection characteristics;

wherein at least one of the fibers is positioned essentially loosely in a protective tube;

wherein at least one of said optical fibers which comprises at least one Bragg grating is fastened to the tube essentially at the position of at least one of said Bragg gratings intended as a stress or strain sensor thus allowing the said Bragg grating to be affected by mechanical stress or strain of the high voltage cable, thus forming a mechanical stress or strain sensing Bragg grating sensor; and where said light source and said measuring device are arranged to emit and receive light, respectively, from a substantially same end of said at least one optical fiber.

2. System according to claim 1, wherein the system comprises one optical fiber being in its longitudinal direction provided with a number of Bragg gratings.

3. System according to claim 1, wherein at least one of said fibers is mounted in a protective tube.

4. System according to claim 3, wherein the tube is a fiber optic cable comprising the optical fibre, in which the fiber optic cable is mounted in the high voltage cable during production so as to constitute a hollow strand in the high voltage cable.

5. System according to claim 3, wherein the tube is a fiber optic cable comprising the optical fiber and being wound around an already suspended high voltage cable.

6. An optical measuring system comprising at least one optical fiber being mounted in a protective tube, the optical fiber containing at least one Bragg grating with known reflection characteristics at a chosen position along the fiber, the fiber being fastened to the protective tube in this position, the system also comprising a light source for emitting light within a known range of wavelengths into the optical fiber and a measuring devices for detection of light reflected from the Bragg gratings based on their known reflection characteristics, where the optical fibre is fastened to the protecting tube; and where said light source and said measuring device are arranged to emit and receive light, respectively, from a substantially same end of said at least one optical fiber.

7. The optical measuring system according to claim 6, wherein each Bragg grating is fastened to the high voltage cable at a chosen position for measuring strain in the high voltage cable at this position.

8. The optical measuring system according to claim 6, wherein the optical fiber is mounted internally in the high voltage cable.

9. The optical measuring system according to claim 6, wherein the optical fiber comprises an outer casing along essentially its whole length and is wound on the outside of the high tension cable.

10. The optical measuring system according to claim 6, wherein all the Bragg gratings are mounted in one optical fiber.

11. A method of monitoring suspended air cables comprising the steps of:

providing a monitoring system having at least one optical fibre with at least one Bragg grating of known reflection characteristics;

mounting the monitoring system on an already suspended aerial cable;

fastening the optical fibre to the suspended cable essentially at the position of said Bragg grating;

emitting light from a light source of a known wavelength range into said optical fibre at an end of said optical fiber;

reflecting said light with said Bragg grating;

detecting light reflected from said Bragg grating;

measuring a wavelength of the reflected light at said end of said optical fiber; and measuring the condition of the Bragg gratings.

12. The method of monitoring suspended air cables of claim 11 wherein the step of fastening the optical fibre to the cable essentially at the position of said Bragg grating comprises:

fastening the optical fibre to a protective tube; and fastening the protective tube to the suspended cable.

* * * * *